(12) United States Patent
Swartz et al.

(10) Patent No.: US 6,676,106 B2
(45) Date of Patent: Jan. 13, 2004

(54) FLAP STRUCTURE FOR ELECTROSTATIC OR MAGNETIC APPLICATIONS AND METHOD FOR MAKING SAME

(75) Inventors: Lars E. Swartz, Sunnyvale, CA (US); David K. Biegelsen, Portola Valley, CA (US)

(73) Assignee: Xerox Corporation, Stamford, CT (US)

( * ) Notice: Subject to any disclaimer, the term of this patent is extended or adjusted under 35 U.S.C. 154(b) by 261 days.

(21) Appl. No.: 09/749,431

(22) Filed: Dec. 28, 2000

(65) Prior Publication Data

US 2002/0086149 A1 Jul. 4, 2002

(51) Int. Cl.$^7$ .......................... F16K 31/02; B32B 15/08
(52) U.S. Cl. ............. 251/129.01; 428/458; 251/129.02; 216/2
(58) Field of Search .......................... 428/458; 251/11, 251/129.01, 129.02; 216/2

(56) References Cited

U.S. PATENT DOCUMENTS

| | | | | |
|---|---|---|---|---|
| 3,118,785 A | * | 1/1964 | Anderson et al. | 250/472.1 |
| 3,170,833 A | * | 2/1965 | Noyes | 264/342 RE |
| 3,308,004 A | * | 3/1967 | Rouault | 156/247 |
| 4,543,295 A | * | 9/1985 | St. Clair et al. | 156/307.7 |
| 4,934,401 A | * | 6/1990 | Ikehata et al. | 137/82 |
| 5,082,242 A | * | 1/1992 | Bonne et al. | 251/129.01 |
| 5,441,597 A | * | 8/1995 | Bonne et al. | 216/2 |
| 6,032,923 A |   | 3/2000 | Biegelsen et al. | 251/129.01 |
| 6,120,002 A | * | 9/2000 | Biegelsen et al. | 251/129.01 |
| 6,123,316 A |   | 9/2000 | Biegelsen et al. | 251/129.01 |

OTHER PUBLICATIONS

Biegelsen, et al., AirJet paper mover: An example of meso–scale MEMS.
D. Biegelsen, et al., "High performance electrostatic air valves formed by thin–film lamination," Proceedings of the Symposium on Micro–Mechanical Systems, ASME International Mechanical Engineering Congress and Exhibition, Nashville, TN, published 1999.

* cited by examiner

Primary Examiner—Paul Thibodeau
Assistant Examiner—Kevin Krver
(74) Attorney, Agent, or Firm—Oliff & Berridge, PLC

(57) ABSTRACT

A thin laminate film structure comprises a first metallic lamina formed on a surface of a first dielectric lamina and a third lamina formed on a surface of the first metallic lamina opposite the first dielectric lamina. Electrical and mechanical properties of the thin laminate film structure may be determined and/or optimized separately. The first metallic lamina and the first dielectric lamina may comprise aluminized mylar. The third lamina may or may not be made of a dielectric material. The thin laminate film structure may further comprise a second metallic lamina formed on a surface of the third lamina opposite the first metallic lamina and a second dielectric lamina formed on a surface of the second metallic lamina opposite the third lamina. In such a case, the thin laminate film structure allows dual-direction actuation of electrostatically and/or magnetically driven devices, such as microdevice valves, in which the thin laminate film structure may be employed.

20 Claims, 2 Drawing Sheets

FLAP STRUCTURE FOR ELECTROSTATIC OR MAGNETIC APPLICATIONS AND METHOD FOR MAKING SAME

BACKGROUND OF THE INVENTION

1. Field of the Invention

This invention relates to thin laminate film structures for electrostatic or magnetic applications and methods for making such thin laminate film structures.

2. Description of the Related Art

One type of electrostatically actuated device with which the thin laminate film structures of this invention may be used is a flexible film, such as a flap or a diaphragm, of a fluid valve. For example, fluid valves having cantilevered blocking films are disclosed in U.S. Pat. No. 6,032,923 to Biegelsen et al., which is incorporated herein by reference in its entirety.

As shown in FIG. 1, a valve 90 has a valve housing 92 that defines an inlet port 94 and an outlet aperture 96. The valve housing 92 is formed by an aperture plate 98 and an opposing port plate 100 positioned in a spaced apart relationship to the aperture plate 98. The aperture plate 98 and the port plate 100 may be separately formed as distinct layers and bonded together with an adhesive layer 99. The port plate 100 may have a curved surface 101 as shown, or may be flat. The aperture 96 is laterally offset from a flap comprising a flexible film 102.

The flexible film 102 is sandwiched between the aperture plate 98 and the port plate 100. The flexible film 102 may have a fixed end 103 held in position between the plates 98 and 100, and an unfixed end 104 that is free to move between the plates 98 and 100. The flexible film 102 is at least in part conductive so that a voltage can be applied to reliably switch the flexible film 102 between an aperture blocking position in which the inlet port 94 is blocked and an aperture open position in which the inlet port 94 is unblocked.

An electrode 106 connected to an electrode voltage source 107 is disposed in the port plate 100. A dielectric layer 97 may be formed on the port plate 100, as shown, or may be incorporated as part of the flexible film 102. When the valve 90 is part of an addressable array, a film voltage source 105 is connected to the fixed end 103 of the flexible film 102. Application of a voltage between the electrode 106 and the flexible film 102 generates an attractive electrostatic force between the electrode 106 and the flexible film 102 to cause the flexible film 102 to move into the aperture blocking position in which the inlet port 94 is blocked.

Other examples provide fluid valves having a diaphragm or membrane as a blocking film, such as the electromagnetic valves disclosed in U.S. Pat. No. 6,123,316 to Biegelsen et al., which is incorporated herein by reference in its entirety.

As shown in FIG. 2, an electromagnetic valve 200 is formed by laminates 202 that define a chamber 203 with an inlet conduit 225 and an outlet conduit 226. A compressively stressed diaphragm 210 made of substantially uniform permalloy or other magnetically susceptible material is positioned in the chamber 203. The diaphragm 210 is stressed to normally close the valve 200 by blocking the outlet conduit 226.

An electrical lead such as a copper planar coil 216 is formed on a dielectric layer 218 of a permalloy layer 214. A certain voltage applied to the coil 216 generates a current which generates a magnetic field providing a sufficiently attractive electromagnetic force between the coil 216 and the diaphragm 210 to pull diaphragm 210 into a non-blocking position 220 to open the valve 200. Reducing or removing the applied voltage allows the diaphragm 210 to spring back into its normal position due to its mechanical bias, and close the valve 200 by blocking the outlet conduit 226.

SUMMARY OF THE INVENTION

This invention provides a thin laminate film structure that allows separate determination and/or optimization of mechanical and electrical or magnetic properties.

This invention separately provides a thin laminate film structure that allows efficient actuation of electrostatically and/or magnetically driven devices.

This invention separately provides a thin laminate film structure that allows a lower voltage to be applied to generate an electrostatic or magnetic force that is sufficient to move the film structure.

This invention separately provides a thin laminate film structure that has stiffness optimized for a given electrostatic or magnetic application.

This invention separately provides a thin laminate film structure that has a desired strength for a given electrostatic or magnetic application.

This invention separately provides a thin laminate film structure for an electrostatically or magnetically actuated valve device.

This invention separately provides a thin laminate film structure that allows dual-direction actuation of electrostatically and/or magnetically driven devices.

This invention separately provides methods for making a thin laminate film structure.

In various exemplary embodiments of the thin laminate film structure and methods according to this invention, a metallic lamina is formed on a surface of a dielectric lamina and a third lamina is formed on a surface of the metallic lamina opposite the dielectric lamina. In various exemplary embodiments, the third lamina is attached to the metallic lamina by a thin film adhesive. In other various exemplary embodiments, the third lamina is attached to the metallic lamina by a thermal compression bond.

In various exemplary embodiments of the thin laminate film structure and methods according to this invention, the metallic lamina comprises a first metallic lamina. A second metallic lamina is formed on a surface of the third lamina opposite the first metallic lamina. A second dielectric lamina is formed on a surface of the second metallic lamina opposite the third lamina.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which.

DETAILED DESCRIPTION OF EXEMPLARY EMBODIMENTS

Figure 1:
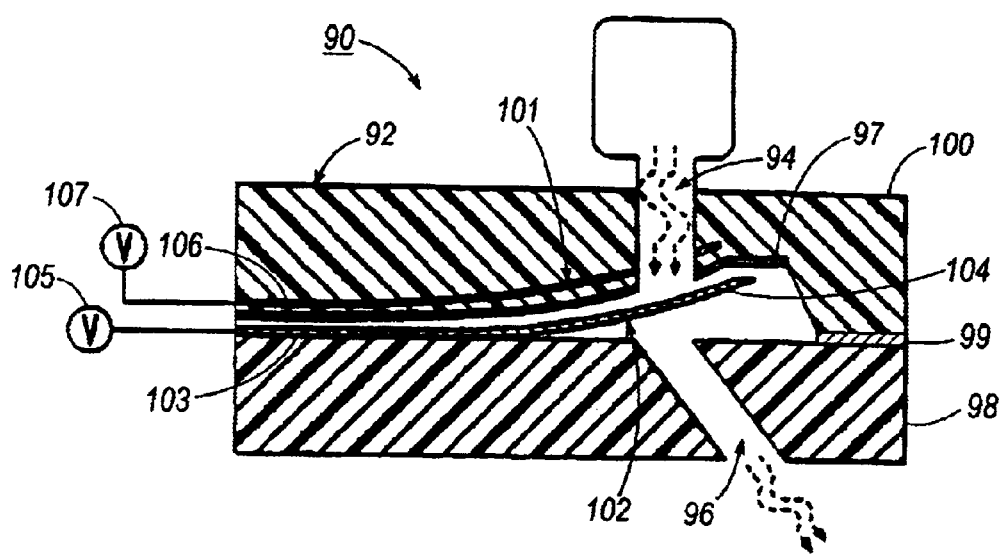
FIG. 1 is a cross-sectional view of an exemplary embodiment of a known electrostatic valve.

In various exemplary embodiments of the thin laminate film structure and methods according to this invention, a first metallic lamina is formed on a surface of a first dielectric lamina and a third lamina is formed on a surface of the first metallic lamina opposite the first dielectric lamina. This results in a thin laminate film structure in which mechanical and electrical or magnetic properties may be optimized separately.

It should be noted that the term "metallic" as used herein is meant to denote a material that comprises a material such that it is electrostatically, magnetically or electromagnetically functional. In other words, the thin laminate film structure of this invention includes a metallic lamina so that it is suitable for use in electrostatic and/or magnetic applications. Thus, the metallic lamina may include using any suitable metal, especially super-paramagnetic or ferromagnetic materials for magnetic applications.

The electrical and/or magnetic properties of the thin laminate film structure may be determined and/or optimized by the design of the first dielectric lamina. Specifically, a thickness of the first dielectric lamina may be determined so that a greater electrostatic or magnetic attractive force acts on the first metallic lamina for a given voltage applied to actuate a device in which the thin laminate film structure is employed. Alternatively, the thickness of the first dielectric lamina may be determined so that a lower voltage is applied to generate an electrostatic or magnetic force that is sufficient to move the thin laminate film structure. Optimizing the thickness of the first dielectric lamina allows efficient actuation of the electrostatically and/or magnetically driven devices in which the thin laminate film structure is employed. The thickness of the first dielectric lamina, however, should be thick enough to electrically insulate the first metallic lamina from the electrode.

The mechanical properties of the thin laminate film structure may be determined and/or optimized by the design of the third lamina. Specifically, a thickness of the third lamina may be determined so that a desired stiffness or flexibility of the thin laminate film structure is achieved for a given application. Further, the thickness of the third lamina may be determined so that the thin laminate film structure has a desired strength. The thickness of the third lamina may be determined without affecting the electrical and/or magnetic properties of the thin laminate film structure. Therefore, the mechanical properties of the thin laminate film structure can be determined and optimized separately and/or independently of the electrical and/or magnetic properties.

The third lamina may also be, but need not be, a dielectric material. Even if the third lamina is a dielectric material, the third lamina will not adversely affect the electrical and/or magnetic properties of the thin laminate film structure because only the first dielectric lamina is disposed between the first metallic lamina and the electrode used to drive the thin laminate film structure.

In various exemplary embodiments, the third lamina is attached to the first metallic lamina by a thin film adhesive. In other various exemplary embodiments, the third lamina is attached to the first metallic lamina by a thermal compression bond. In fact, the laminae of the thin laminate film structure may be attached or bonded together by any suitable technique known or hereafter developed.

The first metallic lamina similarly may be attached to the first dielectric lamina by any suitable technique known or hereafter developed. In particular, the first metallic lamina may be formed by deposition on a surface of the first dielectric lamina.

In various exemplary embodiments of the thin laminate film structure and methods according to this invention, a second metallic lamina is formed on a surface of the third lamina opposite the first metallic lamina and a second dielectric lamina is formed on a surface of the second metallic lamina opposite the third lamina. This thin laminate film structure further allows dual-direction actuation of electrostatically and/or magnetically driven devices in which the thin laminate film structure is employed.

As described above, the mechanical properties of the thin laminate film structure may be determined and/or optimized by the design of the third lamina separately and/or independently of the electrical and/or magnetic properties. Also as described above, the electrical and/or magnetic properties of the thin laminate film structure with respect to the first dielectric lamina may be determined and/or optimized by the design of the first dielectric lamina. Similarly, the electrical and/or magnetic properties of the thin laminate film structure with respect to the second dielectric lamina may be determined and/or optimized by the design of the second dielectric lamina. Further, the electrical and/or magnetic properties of the thin laminate film structure with respect each dielectric lamina may be substantially independent by using a dielectric material for the third lamina.

Figure 3:
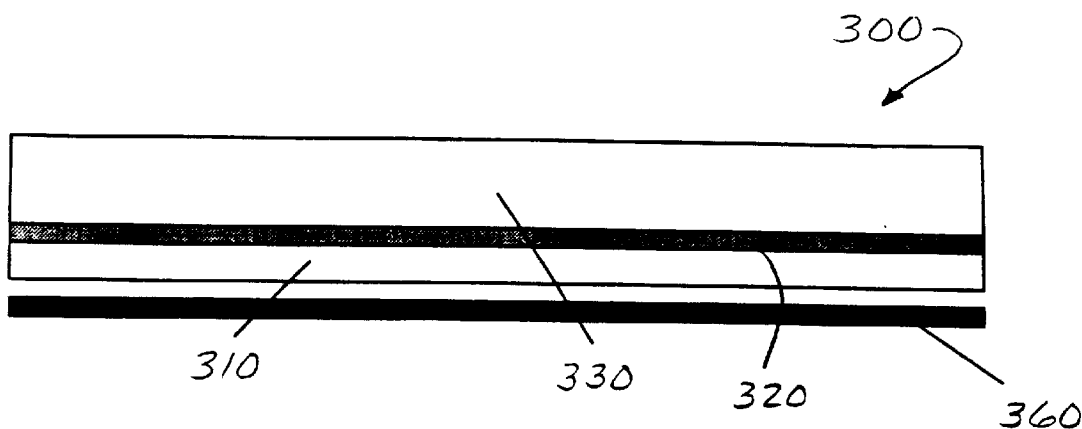
FIG. 3 is a cross-sectional view of a first exemplary embodiment of a thin laminate film structure according to this invention.

Referring now to FIG. 3, a first exemplary embodiment of a thin laminate film structure 300 comprises a first dielectric lamina 310, a first metallic lamina 320 and a third lamina 330. The first dielectric lamina 310, the first metallic lamina 320 and the third lamina 330 are attached or bonded together, for example, by a thin film adhesive between respective layers.

The first metallic lamina 320 is attached to or formed on a surface of the first dielectric lamina 310. For example, the first dielectric lamina 310 and the first metallic lamina 320 may comprise an aluminized mylar sheet. The third lamina 330 is attached or bonded to a surface of the first metallic lamina 320 opposite the first dielectric lamina 310. The third lamina 330 may comprise a mylar sheet.

The mechanical and electrical/magnetic properties of the thin laminate film structure 300 may be optimized separately and/or independently by design of the first dielectric lamina 310 and the third lamina 330, respectively. In the exemplary embodiment shown in FIG. 3, the first dielectric lamina 310 has a thickness of approximately 2 $\mu$m while the third lamina 330 has a thickness of approximately 10 $\mu$m.

The first dielectric lamina 310 is thick enough to insulate the first metallic lamina 320 from electrical contact with an electrode 360 used to actuate the thin laminate film structure for various electrostatic and/or magnetic applications. However, because the thin laminate film structure 300 includes the third lamina 330, the first dielectric lamina 310 may be made thinner and may be determined without adversely affecting the mechanical properties of the thin laminate film structure 300.

The third lamina 330 is thick enough to provide a desired stiffness and/or strength to the thin laminate film structure 300 for a given application. Since the third lamina 330 may be made of a non-dielectric material and/or may be formed on a surface of the first metallic lamina 320 opposite the first dielectric lamina 310, the thickness of the third lamina 330 will not adversely affect the electrical and/or magnetic properties of the thin laminate film structure 300.

For certain applications, such as electromagnetically actuated valves, the first dielectric lamina 310 may have a thickness in the range of about 1 μm–100 μm, the first metallic lamina 320 may have a thickness in the range of about 10 nm–100 nm, and the third lamina 330 may have a thickness in the range of about 1 μm–1 mm. Thus, a ratio of the thickness of the first dielectric lamina 310 to the thickness of the third lamina 330 ranges from about 1–1000.

The stiffness of the layers, considered independently, is proportioned to the Young's modulus, E, of the material times the cube of the layer thickness:

$$K = Et^3W/L^3 \qquad (1)$$

where t, W and L are the thickness, width and length respectively of a cantilevered film. Thus, for example, a mylar (polyester) film that has a thickness of 2 μm, a width of 1 mm and a length of 10 mm would have an approximate stiffness of 250 N/M. Adding another 2 μm thick laminate of mylar would increase the stiffness by a factor of 8, to 2000 N/M without changing the electrostatic attractive force between the metal on the first lamina and the counter electrode.

In a similar manner, the stiffness of a diaphragm film, supported on all sides or only two sides for a bridge structure, can be adjusted independently from the electrostatic force. Conversely, by varying the thickness of the first lamina and maintaining a constant overall film thickness the electrostatic force can be adjusted without changing the stiffness of the film.

Figure 4:
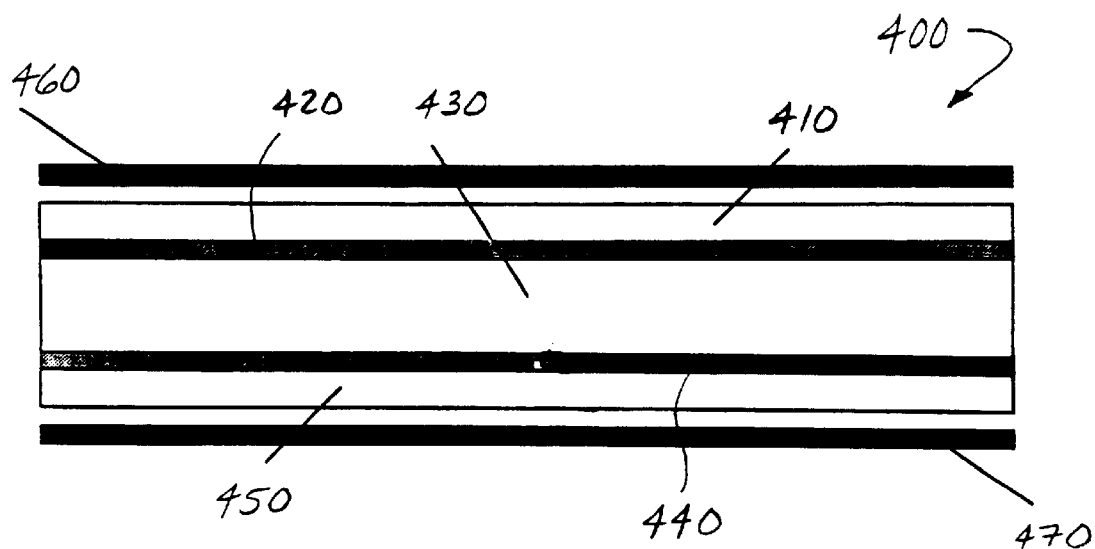
FIG. 4 is a cross-sectional view of a second exemplary embodiment of a thin laminate film structure according to this invention.
Figure 3:
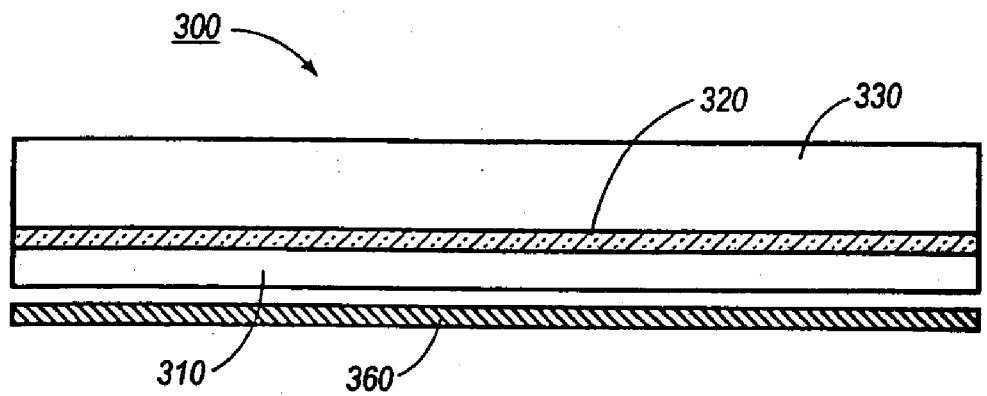
Figure 4:
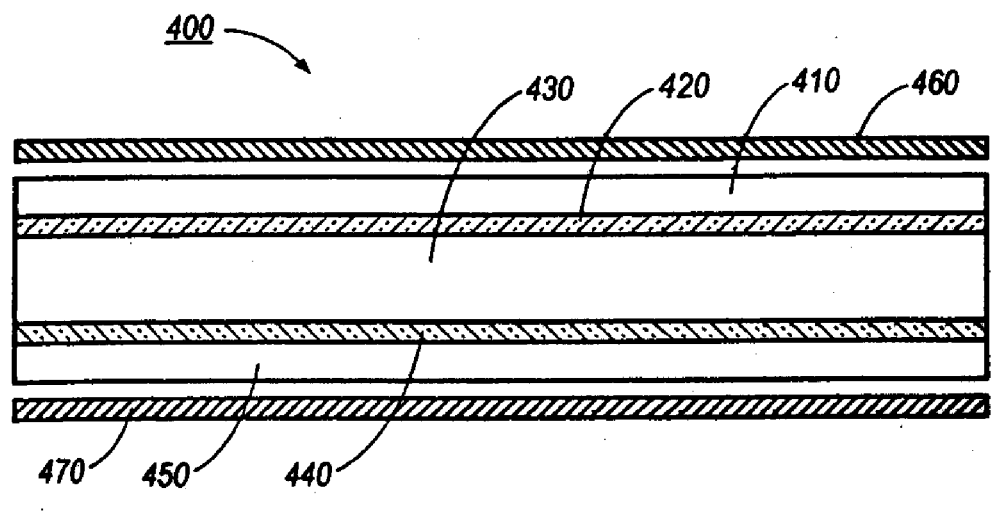

FIG. 4 shows a second exemplary embodiment of a thin laminate film structure 400. In the second exemplary embodiment, the thin laminate film structure 400 comprises a first dielectric lamina 410, a first metallic lamina 420, a third lamina 430, a second metallic lamina 440, and a second dielectric lamina 450. The laminae 410–450 are attached or bonded together, for example, by a thin film adhesive between respective layers.

The first metallic lamina 420 is attached to or formed on a surface of the first dielectric lamina 410. For example, the first dielectric lamina 410 and the first metallic lamina 420 may comprise an aluminized mylar sheet. The third lamina 430 is attached or bonded to a surface of the first metallic lamina 420 opposite the first dielectric lamina 410. The third lamina 430 may comprise a mylar sheet.

The second metallic lamina 440 is similarly attached to or formed on a surface of the second dielectric lamina 450 with the third lamina 430 attached or bonded to a surface of the second metallic lamina 440 opposite the second dielectric lamina 450. The second dielectric lamina 450 and the second metallic lamina 440 also may comprise an aluminized mylar sheet.

The thin laminate film structure 400 allows dual-direction actuation of electrostatically and/or magnetically driven devices in which the thin laminate film structure 400 is employed. For example, as schematically shown in FIG. 4, a first electrode 460 and a second electrode 470 may be included in such a device for driving the thin laminate film structure 400 in opposite directions.

Again, the mechanical and electrical/magnetic properties of the thin laminate film structure 400 may be optimized separately and/or independently by design of the first and second dielectric laminae 410 and 450 and the third lamina 330, respectively. Further, the electrical and/or magnetic properties of the thin laminate film structure 400 with respect each dielectric lamina 410, 450 may be substantially independent by using a dielectric material for the third lamina 430.

In the exemplary embodiment shown in FIG. 4, the first and second dielectric laminae 410 and 450 are each thick enough to insulate the first and second metallic laminae 420 and 440 from electrical contact with the first and second electrodes 460 and 470, respectively. However, because the thin laminate film structure 400 includes the third lamina 430, the first and second dielectric laminae 410 and 450 may be made thinner and may be determined without adversely affecting the mechanical properties of the thin laminate film structure 400.

The third lamina 430 is thick enough to provide a desired stiffness and/or strength to the thin laminate film structure 400 for a given application. Since the third lamina 430 may be made of a non-dielectric material and/or may be formed on surfaces of the first and second metallic lamina 420 and 440 opposite the first and second dielectric lamina 410 and 450, respectively, the thickness of the third lamina 430 will not adversely affect the electrical and/or magnetic properties of the thin laminate film structure 400.

Figure 2:
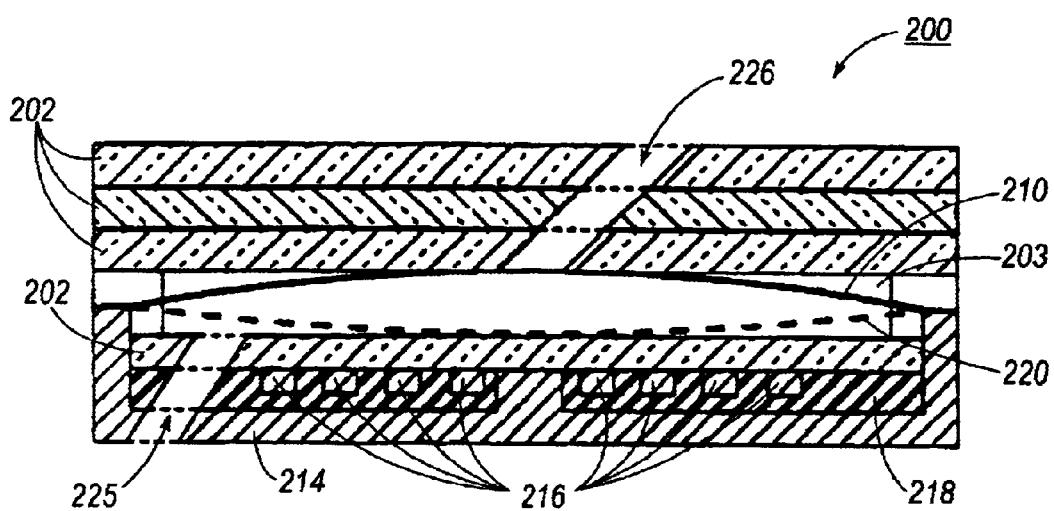
FIG. 2 is a cross-sectional view of an exemplary embodiment of another known electromagnetic valve.

In addition to the microdevice valves described with respect to FIGS. 1 and 2, the thin laminate film structures of this invention may be used in a wide variety of other electrostatic or magnetic applications. For example, an electrostatically or magnetically actuated film structure may be used for optical light path deflection. Also, since movement of the thin laminate film structure will vary the capacitance between the metallic layer(s) and an electrode when a voltage is applied between the electrode and metallic layer (s), an externally applied force can be sensed from a measured change in capacitance, which may be used in applications such as, for example, keypads. The film stiffness can be selected to match the applied forces to optimize membrane deflections.

As such, while this invention has been described in conjunction with the exemplary embodiments outlined above, and with specific reference to valves, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A flap or diaphragm structure, comprising:
   a laminate film including:
      a first drive layer of a material having at least one of the properties selected from the group consisting of electrically conductive, magnetic and magnetically susceptible;
      a first layer of a dielectric material on a first side of the first drive layer;
      a second layer of a material on a second side of the first drive layer opposite the first side;
      a third layer; and
      a second drive layer formed on a surface of the third layer, the second drive layer being attached to a surface of the second layer opposite the first drive layer; and
   at least one electrode that actuates the laminate film, the at least one electrode positioned relative to at least one of the first layer and the third layer with a gap, wherein at least one of the first layer, the second layer, the third layer and one of the drive layers is anchored such that the flap structure is moved by electrostatic or magnetic force generated by the at least one electrode and acting on at least one of the drive layers.

2. The flap structure of claim 1, wherein the material of the second layer is a dielectric material.

3. The flap structure of claim 2, wherein the dielectric material of the first layer and the dielectric material of the second layer are plastic.

4. The flap structure of claim 2, wherein the dielectric material of the first layer of the dielectric material of the second layer are polyester.

5. The flap structure of claim 1, further comprising a thin film adhesive that joins the second layer to the drive layer.

6. The flap structure of claim 1, wherein the second layer is thicker than the first layer.

7. The flap structure of claim 1, wherein the material of the drive layer is aluminum.

8. The flap structure of claim 1, wherein a mechanical property of the flap structure is established, separately from at least one of an electrical property and a magnetic property of the flap structure.

9. The flap structure of claim 1, wherein a mechanical property of the flap structure is optimized, independently from at least one of an electrical property and a magnetic property of the flap structure.

10. The flap structure of claim 1, wherein the second layer is attached to the drive layer by a thermal compression bond.

11. The flap structure of claim 1, wherein the first layer has a thickness in a range of about 1 $\mu$m–about 100 $\mu$m and the second layer has a thickness in a range of about 1 $\mu$m–about 1 mm.

12. The flap structure of claim 1, wherein the at least one electrode comprises two electrodes, one of the two electrodes positioned with a gap relative to the first layer and the other electrode positioned with a gap relative to the third layer.

13. A flap valve structure, comprising:
   a valve housing including at least one inlet port and at least one outlet port; and
   a flap structure, the flap structure comprising:
      a laminate film including:
         a first drive layer of a material having at least one of the properties selected from the group consisting of electrically conductive, magnetic and magnetically susceptible;
         a first layer of a dielectric material on a first side of the first drive layer;
         a second layer of a material on a second side of the first drive layer opposite the first side;
         a third layer; and
         a second drive layer formed on a surface of the third layer, the second drive layer being attached to a surface of the second layer opposite the first drive layer; and
      at least one electrode that actuates the laminate film, the at least one electrode positioned relative to at least one of the first layer and the third layer with a gap, wherein at least one end of at least one of the first layer, the second layer, the third layer and one of the drive layers is anchored such that the flap structure is moved by electrostatic or magnetic force generated by the at least one electrode and acting on at least one of the drive layers.

14. the flap valve structure of claim 13, wherein the at least one electrode comprises two electrodes, one of the two electrodes positioned with a gap relative to the first layer and the other electrode positioned with a gap relative to the third layer.

15. A method for manufacturing a flap structure for a flap valve, comprising:
   forming a first layer of a dielectric material;
   forming a first drive layer over the first layer, the drive layer being of a material having at least one of the properties selected from the group consisting of electrically conductive, magnetic and magnetically susceptible;
   forming a second layer of a material over the first drive layer;
   forming a third layer;
   forming a second drive layer on a surface of the third layer, the second drive layer being attached to a surface of the second layer opposite the first drive layer;
   establishing a mechanical property of the flap structure separately from at least one of an electrical property and a magnetic property of the flap structure;
   positioning at least one electrode relative to at least one of the first layer and the third layer with a gap; and
   anchoring at least one end of at least one of the first layer, the second layer, the third layer and one of the drive layers such that the flap structure is moved by electrostatic or magnetic force generated by the at least one electrode and acting on at least one of the drive layers.

16. The method of claim 15, further comprising forming a film adhesive layer over the drive layer prior to forming the second layer.

17. The method of claim 15, wherein the second layer is formed thicker than the first layer.

18. The method of claim 15, wherein the at least one electrode comprises two electrodes, one of the two electrodes positioned with a gap relative to the first layer and the other electrode positioned with a gap relative to the third layer.

19. A method for manufacturing a flap structure for a flap valve, comprising:
   forming a first layer of a dielectric material;
   forming a first drive layer over the first layer, the drive layer being of a material having at least one of the properties selected from the group consisting of electrically conductive, magnetic and magnetically susceptible;
   forming a second layer of a material over the first drive layer;
   forming a third layer;
   forming a second drive layer on a surface of the third layer, the second drive layer being attached to a surface of the second layer opposite the first drive layer;
   optimizing a mechanical property of the flap structure independently from at least one of an electrical property and a magnetic property of the flap structure;
   positioning at least one electrode relative to at least one of the first layer and the third layer with a gap; and
   anchoring at least one end of at least one of the first layer, the second layer, the third layer and one of the drive layers such that the flap structure is moved by electrostatic or magnetic force generated by the at least one electrode and acting on at least one of the drive layers.

20. the method of claim 19, wherein the at least one electrode comprises two electrodes, one of the two electrodes positioned with a gap relative to the first layer and the other electrode positioned with a gap relative to the third layer.

* * * * *

UNITED STATES PATENT AND TRADEMARK OFFICE
CERTIFICATE OF CORRECTION

PATENT NO.    : 6,676,106 B2
DATED         : January 13, 2004
INVENTOR(S)   : Lars E. Swartz et al.

It is certified that error appears in the above-identified patent and that said Letters Patent is hereby corrected as shown below:

The title page, showing an illustrative figure, should be deleted and substitute therefor the attached title page.

<u>Drawings,</u>
Delete drawing sheets 2 of 2, and substitute therefor the drawing sheet, consisting of FIGS. 3 and 4, as shown on the attached page.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,676,106 B2 | Page 1 of 1 |
| APPLICATION NO. | : 09/749431 | |
| DATED | : January 13, 2004 | |
| INVENTOR(S) | : David K Biegelsen et al. | |

It is certified that error appears in the above-identified patent and that said Letters Patent is hereby corrected as shown below:

Column 1, line 5, insert as a new paragraph:

This invention was made with Government support under DABT63-95-C-0025 awarded by ARPA. The Government has certain rights in this invention.

Signed and Sealed this

Seventh Day of October, 2008

JON W. DUDAS
*Director of the United States Patent and Trademark Office*